United States Patent [19]
Dunkailo

[11] 3,936,286
[45] Feb. 3, 1976

[54] GLASS FIBERIZER WITH IGNITION SYSTEM

[75] Inventor: Peter A. Dunkailo, Newark, Ohio

[73] Assignee: Owens-Corning Fiberglas Corporation, Toledo, Ohio

[22] Filed: Sept. 30, 1974

[21] Appl. No.: 510,530

[52] U.S. Cl. .................................... 65/14; 65/16
[51] Int. Cl.² .................................... C03B 37/04
[58] Field of Search .......... 65/14, 16; 431/196, 256, 431/285

[56] References Cited
UNITED STATES PATENTS

| | | | |
|---|---|---|---|
| 2,247,858 | 7/1941 | Selby | 431/196 X |
| 3,084,380 | 4/1963 | Levecque et al. | 65/14 |
| 3,109,481 | 11/1963 | Yahnke | 431/256 |
| 3,285,724 | 11/1966 | Labino | 65/16 |

Primary Examiner—Arthur D. Kellogg
Attorney, Agent, or Firm—Carl G. Staelin; John W. Overman; Ralph J. Skinkiss

[57] ABSTRACT

A fiberizer with an ignition system is provided. The fiberizer includes an annular combustion chamber with a downwardly directed annular slot positioned to direct the hot products of combustion toward a fiber spinner. The fiberizer has a plurality of radiant cup burners disposed uniformly therearound in an upper portion of the chamber. An ignition burner is located between two of the radiant cup burners and directs a long ignition flame therebetween. The ignition system includes a spark plug for igniting an air-gas mixture in an end of the ignition burner and controls are designed to supply the air-gas mixture to the burner and to provide a spark for the spark plug simultaneously.

2 Claims, 4 Drawing Figures

GLASS FIBERIZER WITH IGNITION SYSTEM

This invention relates to a fiberizer with an ignition system.

A fiberizer, as is known in the glass fiber-forming art, includes an annular combustion chamber narrowing in width from the top toward the bottom. The combustion chamber terminates in a lower, annular opening or slot which is positioned to direct hot products of combustion past a cylindrical wall or face of a fiber-forming spinner. Molten glass or other mineral material is supplied interiorly of the spinner which is rotated at high speed to direct the molten glass out through orifices in the aforesaid spinner wall. The hot combustion products or gases intercept the fibers and aid in turning them downwardly and in further attenuating them into finer diameters. The hot combustion products emanate from a plurality of radiant cup burners located in the upper portion of the combustion chamber and facing downwardly toward the annular opening.

In accordance with the invention, an ignition burner is provided for the combustion chamber which burner directs an ignition flame inwardly through a side wall portion of the fiberizer between two of the radiant cup burners. The ignition burner port, being located between two of the radiant cup burners, avoids possible erosion due to impingement by the combustion products of the radiant cup burners. This position also keeps the ignition flame in a relatively calm area to prevent the possibility of blow-off. In order to provide a long ignition flame, the ignition burner includes a central or main orifice through which an air-gas mixture is directed and further includes transverse passages communicating with an annular, low velocity ignition space around the main orifice, with a spark plug being located in this annular space. The spark plug thereby can provide positive and effective ignition for the air-gas mixture and, at the same time, the long flame is achieved by the air-gas mixture passing at relatively high velocity through the central orifice.

The air-gas mixture for the ignition burner is controlled through a solenoid-operated valve and the spark for the spark plug is achieved through a transformer. Power is supplied to the spark plug and the solenoid-operated valve is simultaneously opened through a single control switch. This arrangement prevents the accidental supply of the air-gas mixture to the ignition burner without ignition and provides a relatively simple operation. When the operator closes the switch to provide the spark for the spark plug and the air-gas mixture for the burner, the spark will occur slightly before the air-gas mixture reaches the burner to assure initial ignition of the mixture. With the switch held closed, the operator can then simply turn on the main air-gas mixture valve for the radiant cup burners with the other hand. When ignition of the main air-gas mixture is achieved, the switch can then simply be released to terminate the ignition flame.

It is, therefore, a principal object of the invention to provide a fiberizer with an ignition system.

Another object of the invention is to provide a fiberizer with an ignition burner positioned between two of the fiberizer burners to provide more effective ignition of the burners.

Still another object of the invention is to provide an ignition system which produces a long ignition flame.

Yet another object of the invention is to provide an ignition system in which an air-gas mixture and an ignition spark are applied to an ignition burner at substantially the same time through a single control.

Many other objects and advantages of the invention will be apparent from the following detailed description of a preferred embodiment thereof, reference being made to the accompanying drawings, in which.

Figure 1:
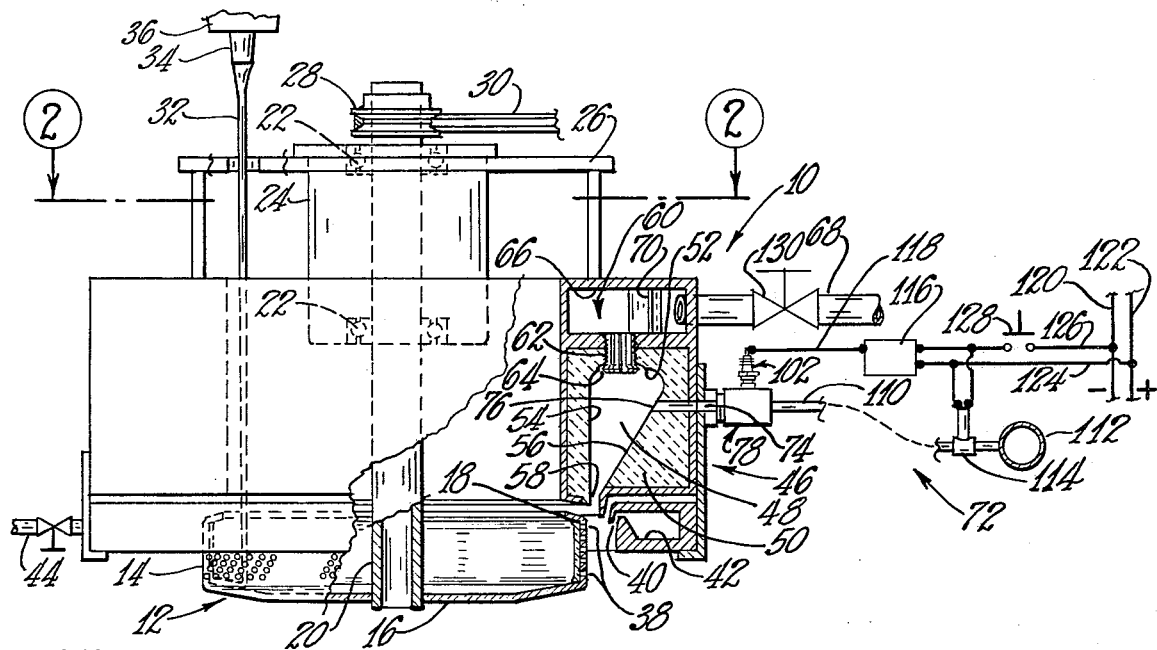
FIG. 1 is a somewhat schematic side view in elevation, with parts broken away and with parts in section, of fiber-forming apparatus embodying the invention, certain parts in section being taken along the line 1—1 of FIG. 2.

Referring particularly to FIG. 1, fiber-forming apparatus embodying the invention is indicated at 10. The apparatus includes a fiber-forming spinner 12 having a generally cylindrical side wall or face 14, a closed bottom wall 16, and an open top 18. The spinner 12 is mounted on a spindle 20 which is rotatably carried by bearings 22 in a support housing 24 mounted on a frame 26. The spindle 20 is rotated through a sheave 28 by a belt 30 driven through a suitable motor (not shown).

Molten glass or other mineral material is supplied in a stream 32 to the spinner 12 from an outlet tip 34 of a suitable melter 36. This stream is intercepted by the bottom wall 16 of the spinner and the molten glass is directed to the cylindrical wall 14 from which it is attenuated into primary fibers through orifices 38 located in the spinner wall.

An outer annular stream of steam or hot gases is supplied through an annular slot 40 of an annular chamber 42 to which the steam or gas is supplied through a supply line 44. This outer annular stream aids in turning the fibers emitted from the orifices 38 downwardly so that the fibers can be collected on a conveyor or other suitable surface, as is known in the art.

An inner annular stream of hot products of combustion is supplied by a fiberizer indicated at 46. This inner hot stream of combustion products aids in further attenuating the primary fibers of molten material from the orifices 38 and also aids in directing the resulting fibers in a downward direction. The fiberizer 46 includes an annular combustion chamber 48 in a refractory body 50 and formed by an upper wall 52, an inner side wall 54, and an outer side wall 56 which terminate in a lower annular slot or opening 58. The side walls 54 and 56 converge as they approach the slot 58 so that the combustion chamber 48 is of decreasing width from the top to the bottom.

Figure 2:
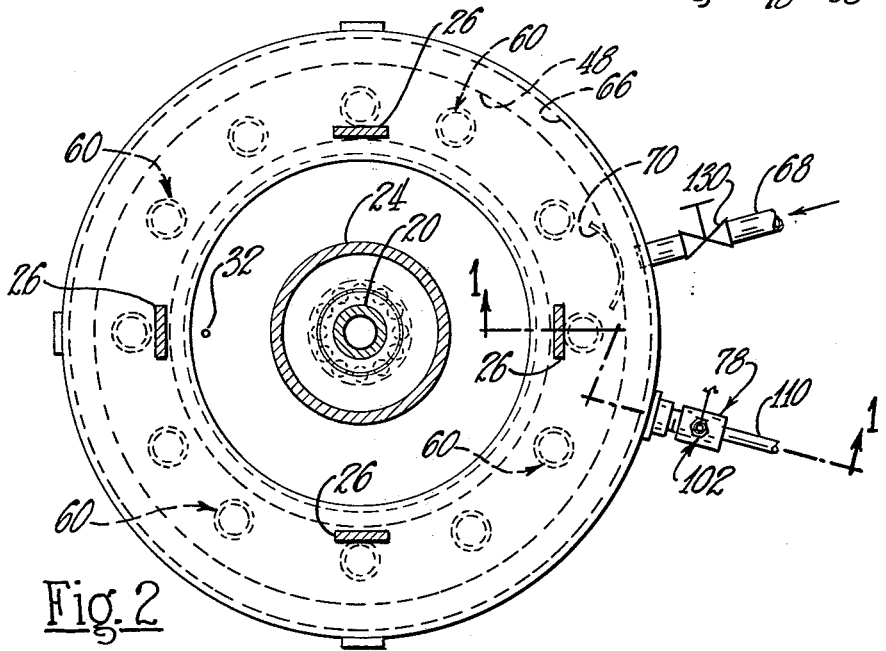
FIG. 2 is a view in horizontal section, taken along the line 2—2 of FIG. 1.

Radiant cup burners indicated at 60 are located in the top wall 52 of the combustion chamber 48 and are uniformly disposed therearound, as shown particularly in FIG. 2. Each of the burners 60 includes a refractory body or core 62 (FIG. 1) terminating in a recess or cup 64 in the upper wall 52. The core 62 has vertical passages therein which terminate in diagonal passages to direct an air-gas mixture along the surface of the cup where the mixture burns effectively with the aid of surface combustion. A resulting flame front exists just below the core 62 across the recess 64. The air-gas mixture for the burners 60 is supplied from an annular manifold chamber 66 formed above the burners and receiving the mixture from a suitable line 68. The air-gas mixture entering the chamber 66 is directed therearound by a baffle 70 (FIG. 2) to aid in uniform distribution of the mixture. The combusted gases from the burners 60 are directed downwardly and are emitted from the annular slot 58 at substantial velocity. The hot, high-velocity gases intercept the primary fibers from the orifices 38 and cause further attenuation of them as well as aid in directing them downwardly from their horizontal path.

It will be understood that the ignition of the burners 60 in the chamber 48 of the fiberizer 46 is extremely difficult since the only access is through the slot 58. Heretofore, a substantial explosive mixture resulted before ignition could be achieved. This would cause a small explosion within the chamber 48 and sometimes damage the refractory body 50 in which the chamber is formed. Ignition also constituted a hazard for the operator and was both laborious and time consuming.

In accordance with the invention, an ignition system indicated at 72 is provided for the fiberizer 46 to overcome the previous difficulties. The system 72 includes an ignition flame passage 74 formed in the refractory block 50 and terminating in an oval opening 76 in the outer side wall 56 of the chamber 48 near the upper wall. The passage 74 can be formed integrally in the refractory body 50 with the aid of a removable core when the chamber 48 is formed. The passage 74 directs the ignition flame toward the inner side wall 54 between two of the burners 60, as shown particularly in FIG. 2. This position of the ignition flame is more effective in providing rapid ignition of the air-gas mixtures for the burners 60. The position also places the ignition flame in a relatively calm area to reduce the possibility of blow-off by the burning gases emanating from the main burners. Finally, this position minimizes the possibility of erosion of the opening 76 of the passage 74.

Figure 4:
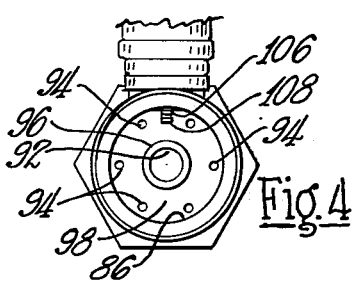
FIG. 4 is a front end view of the burner of FIG. 3.
Figure 3:
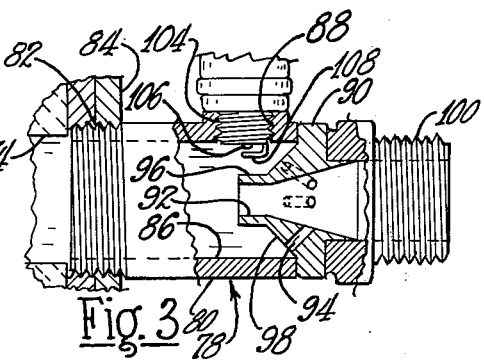
FIG. 3 is an enlarged, fragmentary view, with parts broken away and with parts in section, of an ignition burner forming part of the ignition system of FIG. 1.

The system 72 further includes an ignition burner 78 which is located entirely outside of the fiberizer 46 and communicates with the flame passage 74. The burner 78, as shown in FIGS. 3 and 4, includes a cylindrical metal member 80 having a threaded end 82 which is received in outer metal walls 84 of the fiberizer 46. The member 80 forms an internal combustion chamber 86 and has a transverse threaded opening 88 communicating therewith. The burner 78 also includes a rear orifice member or spud 90 suitably affixed to the metal member 80 and forming a main orifice 92 and transverse orifices or passages 94. The member 90 also has a forwardly extending spout 96 which defines an outer short annular ignition space or chamber 98 with the metal member 80 at the rear end of the cylindrical combustion chamber 86.

An air-gas mixture supplied through a rear threaded fitting 100 is directed at high velocity through the main orifice 92 with smaller portions of the air-gas mixture directed outwardly through the transverse passages 94 into the annular ignition space 98. A spark plug 102 has a threaded opening 88 and has electrodes 106 and 108 positioned in the annular space 98. When a sufficient voltage appears across the electrodes 106 and 108 and a spark occurs therebetween, the small amount of air-gas mixture in the annular space 98 is ignited and this in turn causes ignition of the main ignition flame which extends from the main orifice 92 through the combustion chamber 86, the passage 74, and into the combustion chamber 48. The relatively low velocity of the gases in the annular ignition space 98 assures proper ignition of those gases which in turn assures positive ignition of the main ignition flame.

The air-gas mixture for the burner 78 is supplied through a line 110 from a manifold 112. This same manifold 112 can supply the air-gas mixture for the line 68 for the burners 60, if desired. A solenoid-operated valve 114 is located in the line 110 to control the supply of the air-gas mixture from the manifold 112 to the burner 78. This valve 114 is normally closed but is open when the solenoid coil is energized.

A suitable transformer 116 supplies power to the spark plug 102 through a line 118, the transformer having a rating of 5000 volts, by way of example. Power for both the solenoid-operated valve 114 and the transformer 116 can be supplied from main lines 120 and 122 through branch lines 124 and 126. A single control switch 128, when closed, connects the lines with both the solenoid-operated valve 114 and the transformer 116. This causes substantially simultaneously a spark between the electrodes 106 and 108 in the annular space 98 and also a flow of the air-gas mixture through the line 110 to the burner 78. The spark will actually occur slightly before the air-gas mixture reaches the burner 78, depending upon the relative position of the burner and the valve 114, so that an air-gas mixture cannot build up in the burner 78 prior to ignition.

In the operation of the ignition system, the operator, when desiring to fire up the fiberizer 46, simply closes the switch 128 to cause the ignition flame to originate and be directed into the chamber 48. The operator holds the switch 128 in while he turns on an adjacent valve 130 to supply the main air-gas mixture through the line 68 to the burners 60. The switch 128 then can be released and opened to shut off the ignition flame and enables the burners 60 to continue operating in the usual manner.

Various modifications of the above-described embodiment of the invention will be apparent to those skilled in the art and it is to be understood that such modifications can be made without departing from the scope of the invention if they are within the spirit and tenor of the accompanying claims.

I claim:

1. In apparatus for forming fibers from molten glass including in combination, a hollow spinner having an orificed peripheral wall, means for supplying molten glass to said spinner, means for rotating said spinner thereby centrifuging streams of molten glass from said orifices, attenuating means including an annular combustion chamber having an annular exit adjacent the peripheral wall of said spinner such that the mixture combusted therein exits said chamber transversely engaging the molten streams of glass, the improvement comprising, a combustion chamber lighting system including an ignition burner located outside of said combustion chamber and having a flame passage communicating with said combustion chamber, and means for supplying an air-fuel mixture to said ignition burner.

2. In apparatus for forming fibers from molten glass including in combination, a hollow spinner having an orificed means for rotating said spinner thereby centrifuging streams of molten glass from said orifices, an annular combustion chamber having a plurality of radiant cup burners equally spaced and positioned in the upper wall portion of said combustion chamber, said combustion chamber circumferential walls converging from said cup burners to form an annular exit adjacent the peripheral wall of said spinner such that the mixture combusted therein exits said combustion chamber transversely engaging said molten streams of glass thereby attenuating said streams of molten glass into fibers, the improvement comprising, a combustion chamber lighting system including an ignition burner located outside said annular combustion chamber and having a flame passage communicating with said chamber between two of said radiant cup burners and extending transversely to the direction of flow of the combustable mixture flowing from said radiant cup burners, said ignition burner including a combustion chamber, means for supplying an air-fuel mixture to the combustion chamber of said ignition burner, means for igniting said air-fuel mixture in the ignition burner, and means for simultaneously operating the air-fuel mixture supply means and ignition means.

* * * * *